United States Patent [19]
Kato et al.

[11] Patent Number: 5,638,185
[45] Date of Patent: Jun. 10, 1997

[54] MOBILE FACSIMILE MACHINE

[75] Inventors: Hideharu Kato; Yoshihiro Naruse, both of Chiba Pref., Japan

[73] Assignees: Aisin Seiki Kabushiki Kaisha, Kariya; Kabushiki Kaisha Shinsangyokaihatsu, Tokyo, both of Japan

[21] Appl. No.: 657,900

[22] Filed: Jun. 7, 1996

Related U.S. Application Data

[63] Continuation of Ser. No. 581,931, Sep. 13, 1990, abandoned.

[30] Foreign Application Priority Data

Sep. 13, 1989 [JP] Japan ............................ 1-238092

[51] Int. Cl.$^6$ ............................................. H04N 1/00
[52] U.S. Cl. ............................ 358/434; 358/400; 358/405; 358/435; 358/436; 358/437; 358/438; 358/439
[58] Field of Search .................................. 358/400, 405, 358/434, 435, 436, 437, 438, 439; 379/100, 59, 60; 455/54.1; 371/32, 33; H04N 1/00

[56] References Cited

U.S. PATENT DOCUMENTS

| | | | |
|---|---|---|---|
| 4,581,656 | 4/1986 | Wada | 358/437 |
| 4,796,091 | 1/1989 | Nohtomi | 358/444 |
| 4,823,376 | 4/1989 | Takahashi | 358/400 |
| 4,885,755 | 12/1989 | Yoshida | 379/100 |
| 4,887,162 | 12/1989 | Arai | 358/443 |
| 4,907,094 | 3/1990 | Mishima et al. | 358/437 |
| 4,920,427 | 4/1990 | Hirata | 358/437 |
| 4,975,783 | 12/1990 | Takaoka | 358/437 |
| 5,003,405 | 3/1991 | Wulforst | 358/400 |
| 5,073,827 | 12/1991 | Nakajima | 358/437 |

*Primary Examiner*—Thomas L. Stoll
*Attorney, Agent, or Firm*—Sughrue, Mion, Zinn, Macpeak & Seas

[57] ABSTRACT

In a mobile facsimile machine capable of sending and receiving messages through a transmitter and receiver, respectively, a first memory is provided for memorizing the identification of a sender when receiving signals. A second memory is provided for memorizing the position of the last signal received should communication be disconnected or disrupted during reception. A calling device automatically calls the sender using the identification in the first memory and sends the position of the signal at disruption from the second memory so the sender can retransmit from the point of disruption.

5 Claims, 10 Drawing Sheets

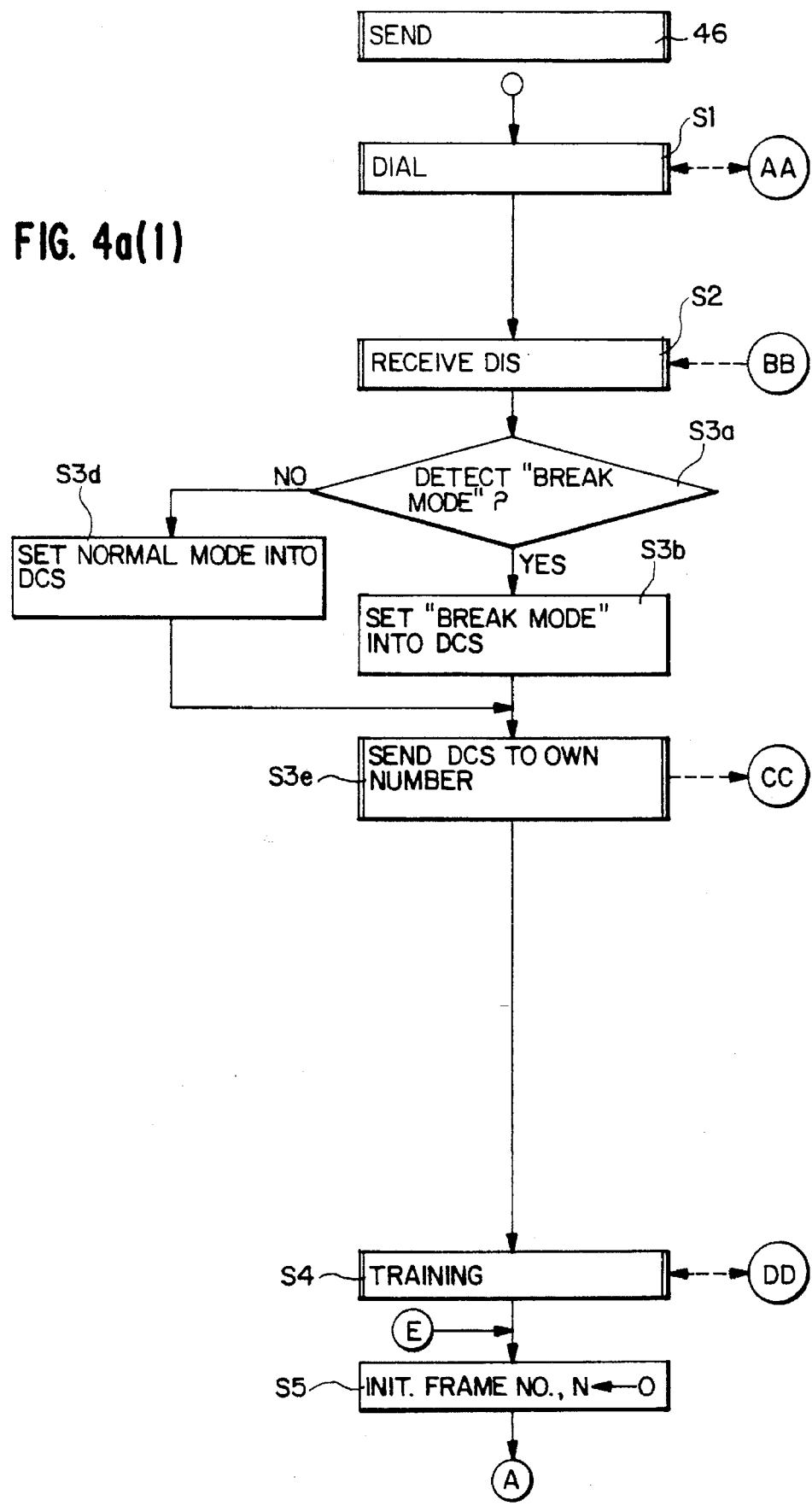
FIG. 4a(1)

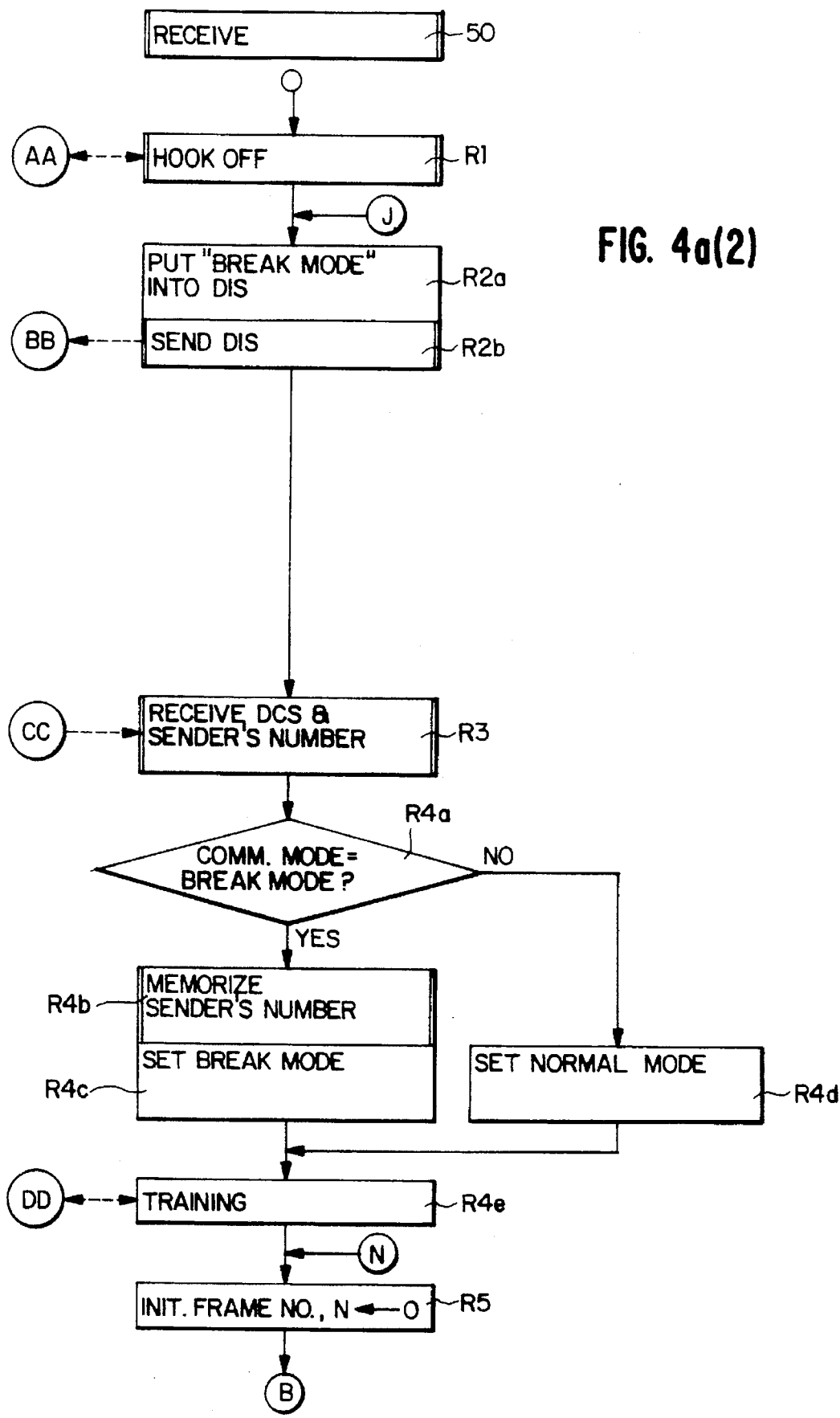
FIG. 4a(2)

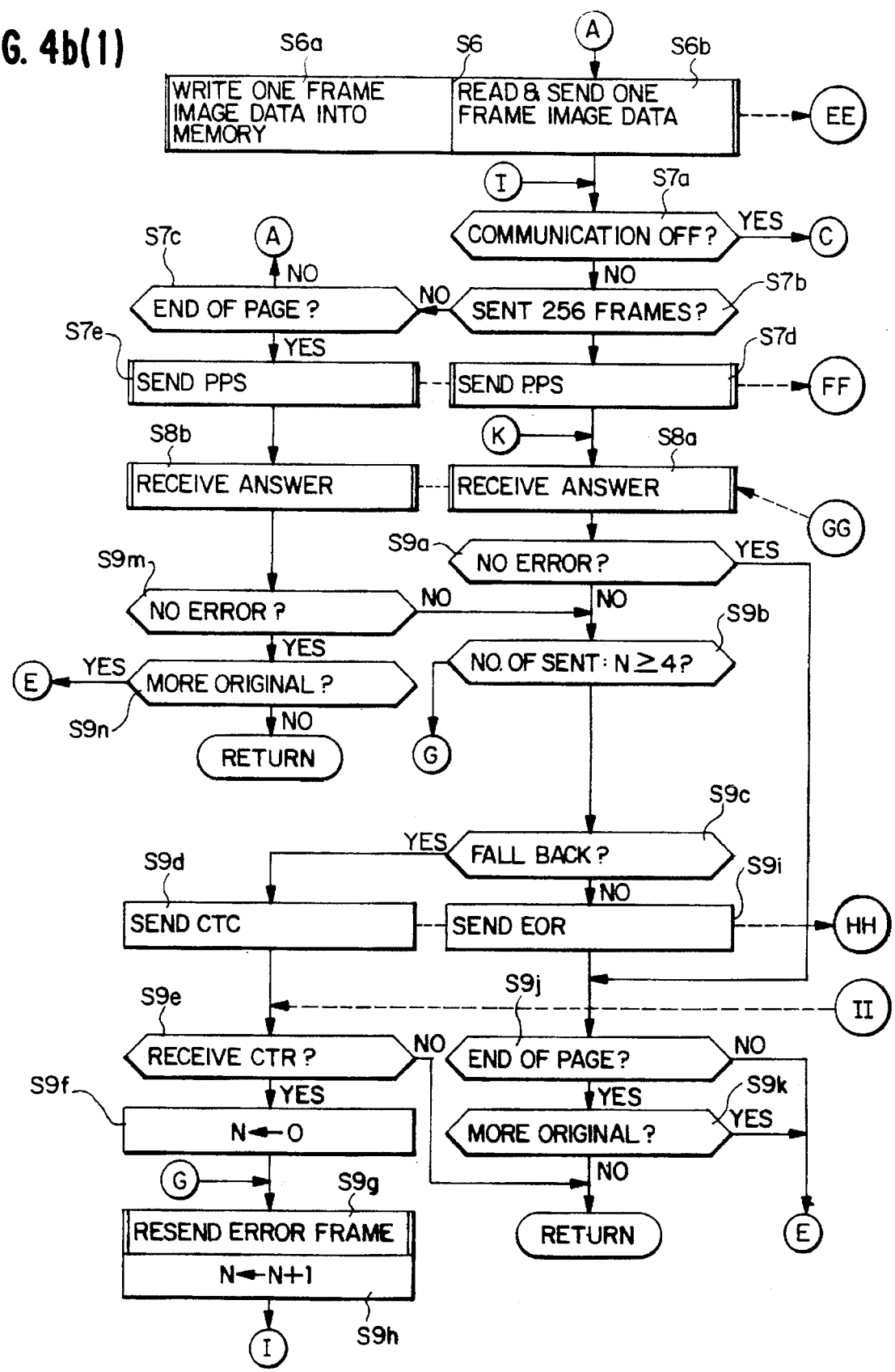
FIG. 4b(1)

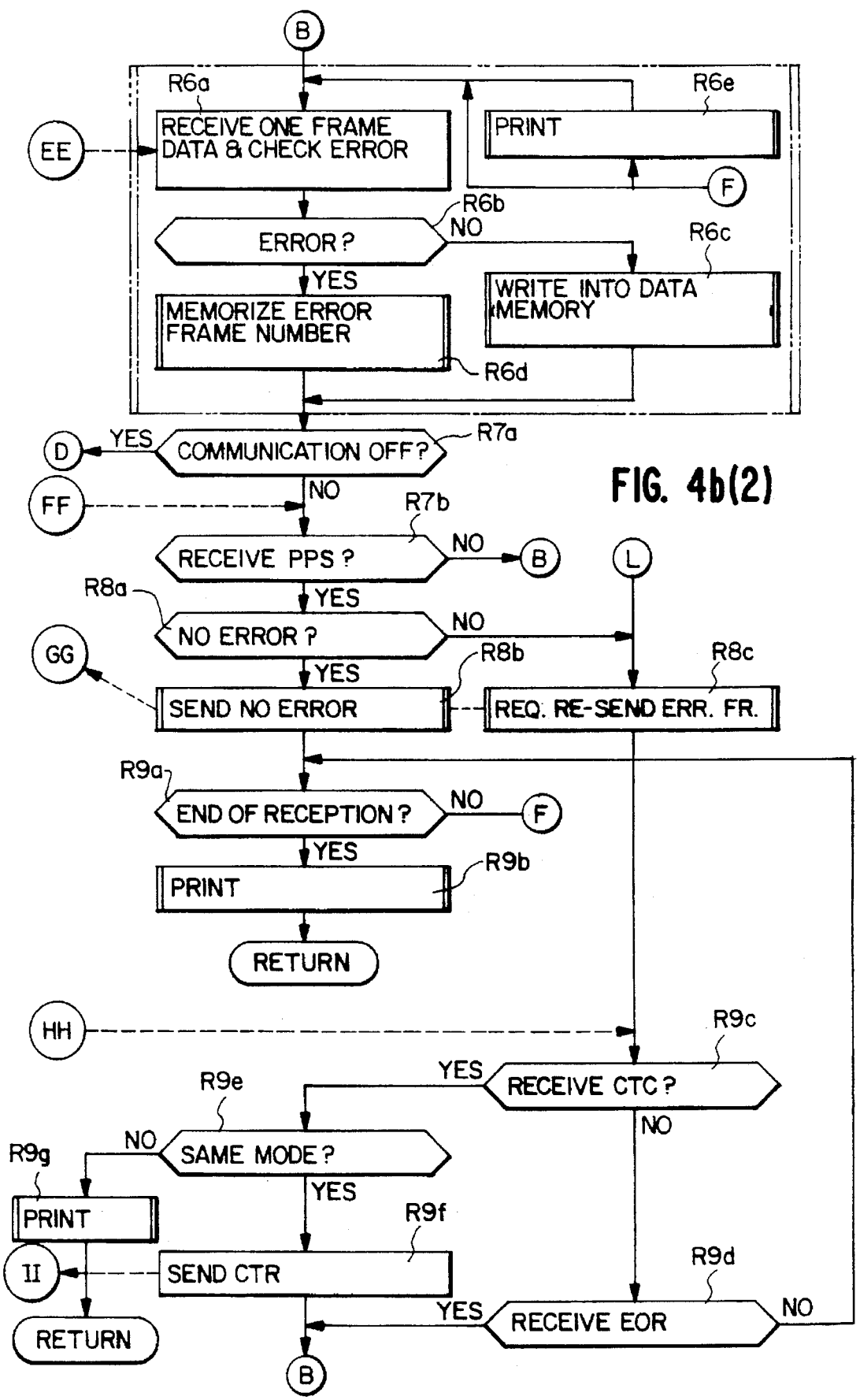
FIG. 4b(2)

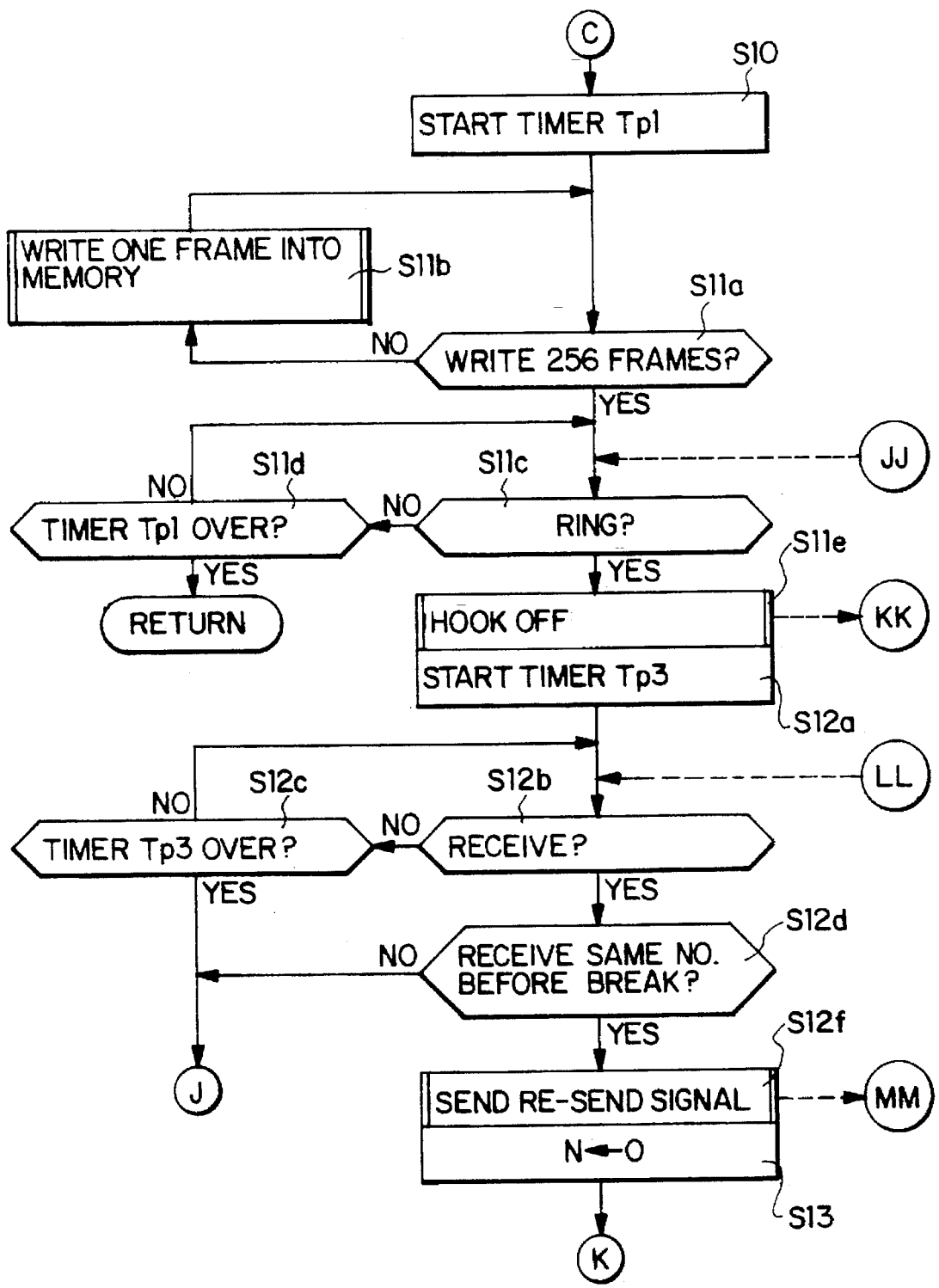
FIG. 4c(1)

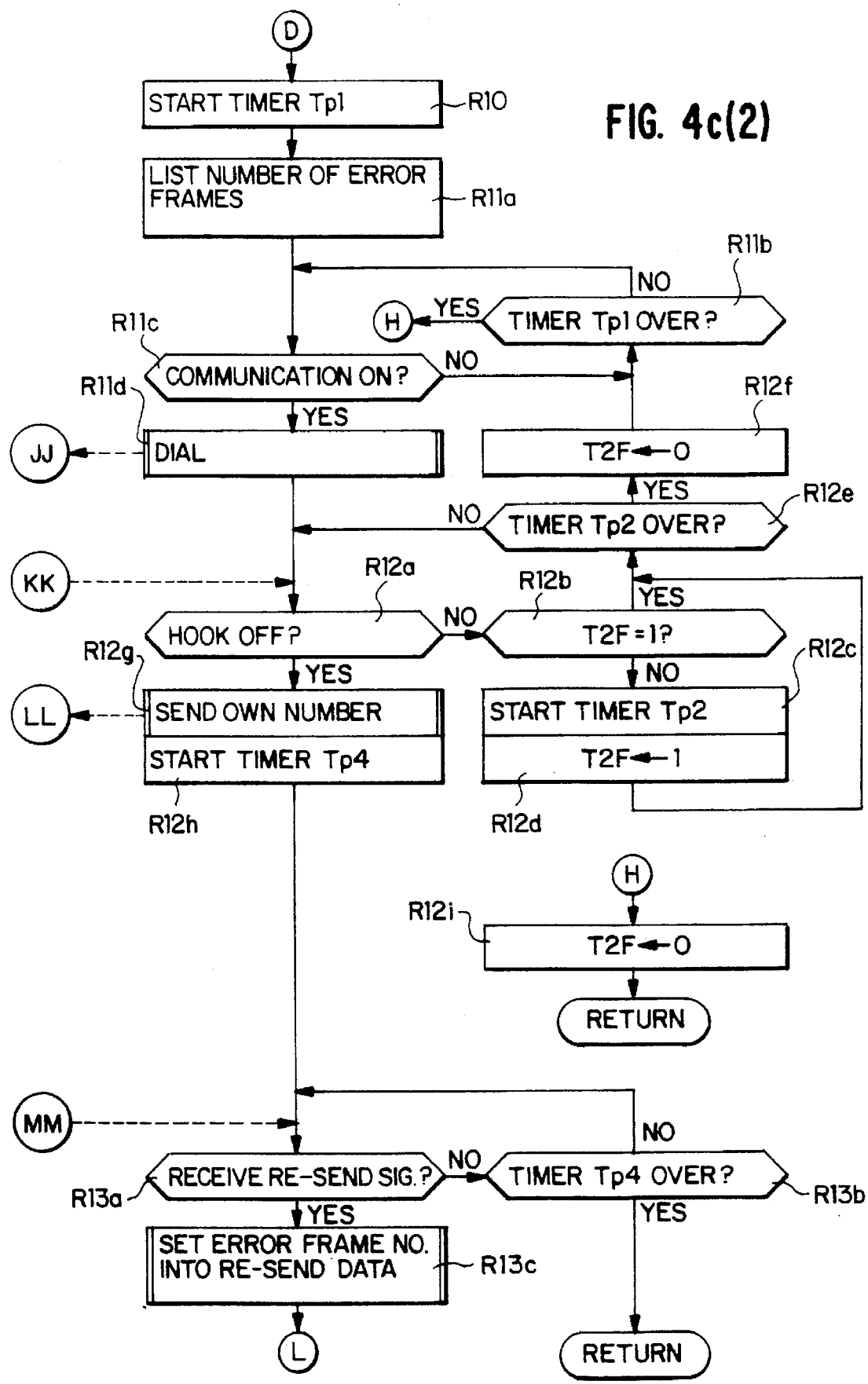
FIG. 4c(2)

MOBILE FACSIMILE MACHINE

This is a continuation of application Ser. No. 07/581,931 filed Sep. 13, 1990, now abandoned.

BACKGROUND OF THE INVENTION

1. Field of the Invention

The present invention relates to a facsimile machine that sends and receives an image signal through a mobile telephone and especially to a communication control device which controls the sending and receiving of an image signal in the mobile facsimile machine.

2. Description of the Related Art

In a conventional facsimile machine, when the communication is disconnected during a communication, both the sending and receiving of the facsimile and its communication automatically shut off. When a facsimile machine is set in an automobile, a transceiver is mounted in the automobile to connect the facsimile machine with a communication network. An automobile telephone is used as a communication device in the automobile which is comprised of a transceiver and telephone. When a facsimile machine is connected to a mobile telephone, a network control unit NCU is connected to the transceiver and the telephone and the facsimile machine are connected to the NCU.

When a facsimile machine is used with the mobile telephone, if the automobile goes into a tunnel or gets behind an obstacle such as a building, the communication is disconnected because the sending and receiving waves stop. When this happens, the sender has to send the signal again. Since the receiver is mounted on an automobile, it is difficult to know whether the receiver is within the area where it can receive and transmit. If the receiver is out of range, it is difficult for the sender to connect with a receiver. It is also difficult for the sender to know when the receiver will be available to connect. Therefore, it may take extra time to send the data once a transmission is disconnected.

SUMMARY OF A PREFERRED EMBODIMENT OF THE INVENTION

An object of the present invention is to provide a mobile facsimile machine which can communicate effectively even if the first communication was interrupted.

In order to achieve the above-mentioned invention, the present invention of a mobile facsimile machine comprises a sending means for sending image signals through a transmitter; receiving means for receiving image signals through a receiver; first memory means for memorizing an identification of the sender when receiving the signals; second memory means for memorizing a position of signals if the communication is disconnected during reception; calling means for calling the sender by using the memorized identification and for sending the memorized position of the signals to the sender.

In accordance with a mobile facsimile machine of the present invention, the first memory means memorizes the sender's identification number while in communication. If the communication is disconnected, the second memory means memorizes the position of the image signal. The calling means calls the sender using the memorized identification number and sends the position information to the sender. Therefore, if the interruption was made by some obstacle which causes an interruption of radio waves, the calling means calls back the sender and sends a position signal where the disconnection had occurred. Thus, the sender can receive a connection and also information which shows a position where the disconnection was made. Then the transmission can be ordered by the receiver. The sender only has to wait for a call from the receiver even though a transmission was disconnected.

THE DESCRIPTION OF THE DRAWINGS

The objects and advantages of the invention will become apparent from the following detailed description of the preferred embodiment thereof in connection with the accompanying drawings in which:

FIG. 1 is a block diagram of a facsimile in accordance with the present invention.

FIGS. 2a and 2b flow charts which shows an operation of CPU 13 in FIG. 1.

FIG. 3 is a flow chart which shows an operation of CPU 33 in FIG. 1.

FIGS. 4a, 4b and 4c are flow charts which show a subroutine 46 and a subroutine 50 in FIG. 3.

DETAILED DESCRIPTION OF A PREFERRED EMBODIMENT OF THE INVENTION

Figure 1:
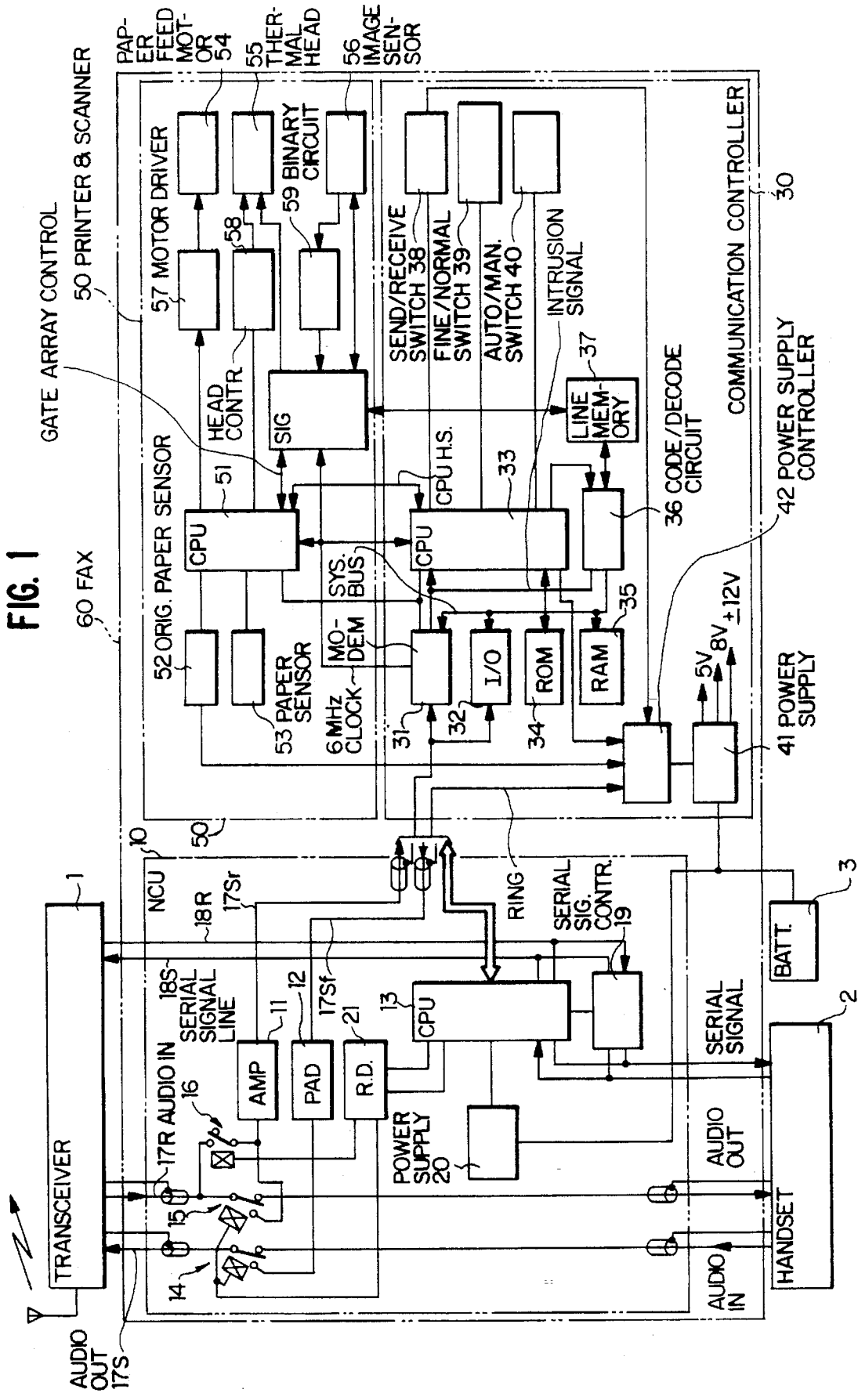
Figure 2A:
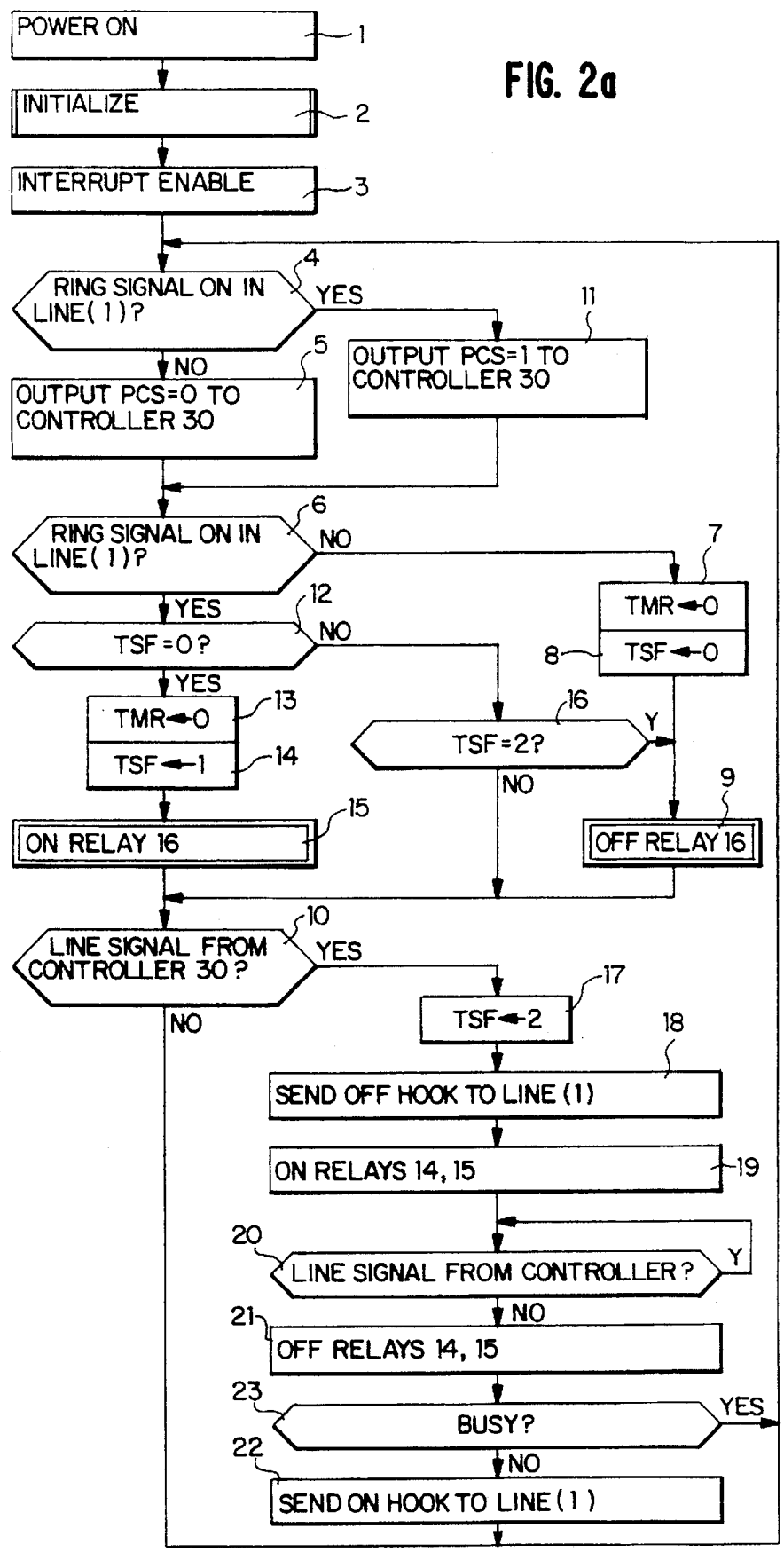
Figure 2B:
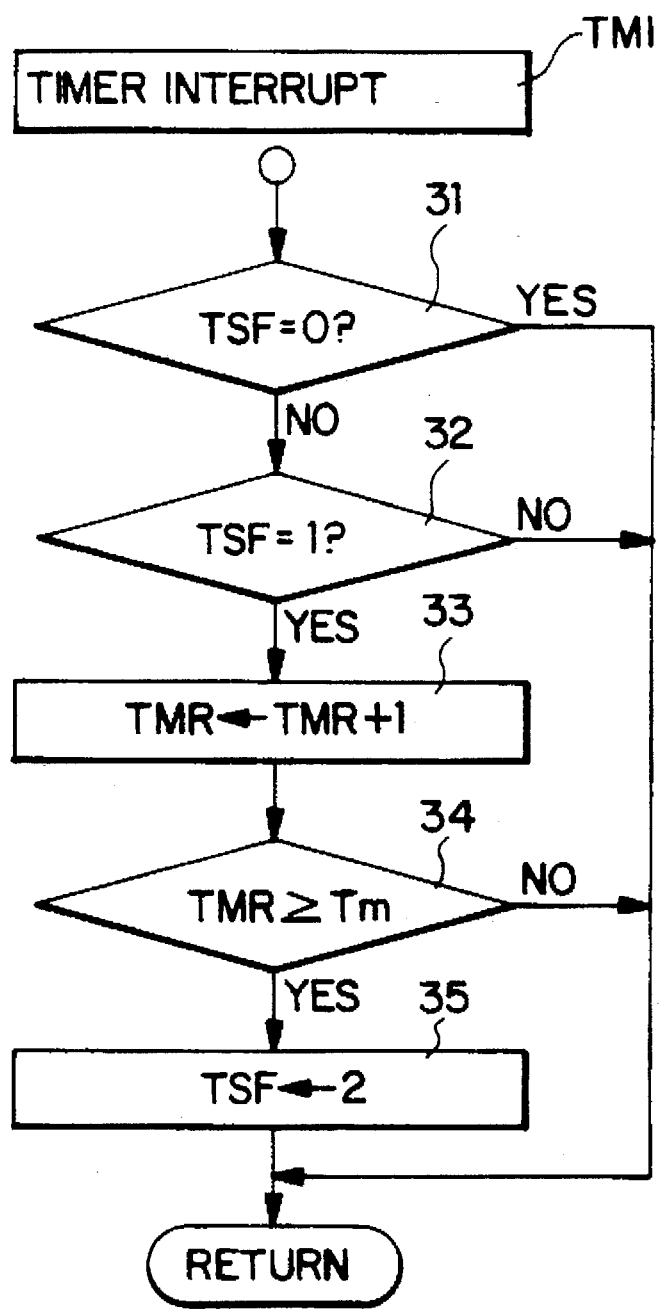
Figure 3:
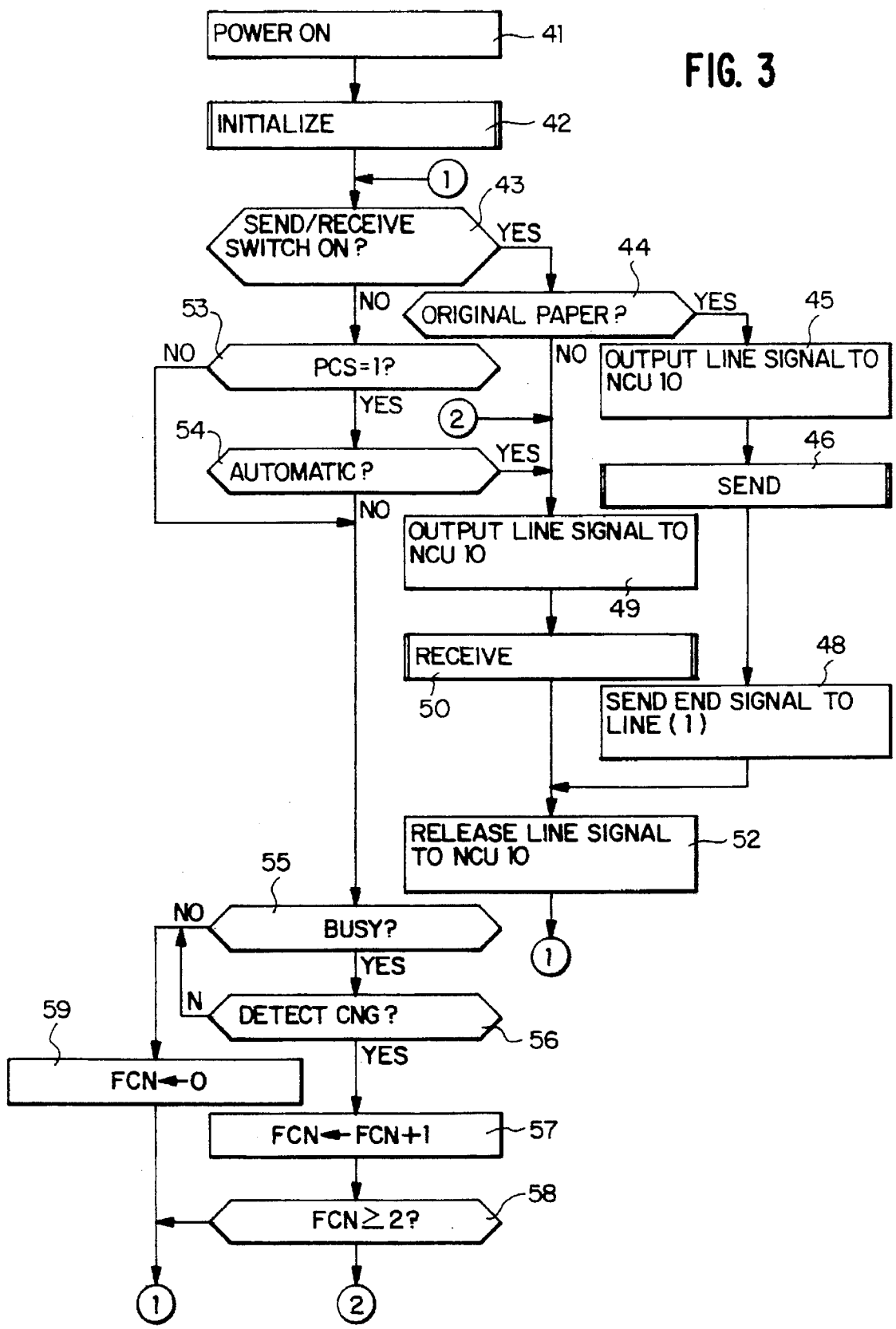

One embodiment of a facsimile in accordance with the present invention is shown in FIG. 1. In this embodiment, a facsimile machine is provided with a handset or telephone device 2. The facsimile machine is connected to a transceiver 1 to connect with the telephone network so that the facsimile machine can send image data and also can communicate with a conventional telephone. The facsimile machine 60 is comprised of a network control unit (NCU) 10, communication controller 30 and a printer and scanner 50. Power is supplied to the facsimile machine 60 by a battery 3 so that the facsimile machine provides a power supply circuit 41 to transfer a direct current voltage from the battery to various voltages required by the facsimile machine. NCU 10 is provided with an audio signal line 17S (send), 17R (receive), switching relays 14, 15, amplifier AMP 11, PAD12, relay driver 21, power supply circuit 20 and CPU 13 which controls the relays. NCU 10 is also provided with serial signal line 18S (send), 18R (receive). CPU 13 is provided with a program which is shown in FIGS. 2a and 2b. The construction of the facsimile machine 60 is similar to a conventional office facsimile machine except for a power supply circuit 41, which is designed for an automotive battery. CPU 33 in the communication controller 30 is provided with a program which is shown in FIG. 3 and FIG. 4a. When the power is turned on, CPU 13 of NCU 10 executes a line connect operation in FIG. 2a and CPU 33 of the communication controller 30 executes a line request operation shown in FIG. 3.

Referring to FIG. 2a, when the power is turned on (step 1), CPU 13 initializes its internal memories (step 2). The relays 14, 15 and 16 are set off by the initialization as is shown in FIG. 1. In step 3, CPU 13 enables an interruption and then waits for a ring from the automobile telephone 1. It then waits for a line request by the communication controller 30 (4-5-6-7-8-9-10-4). This routine is called "waiting condition" of CPU 13. An interruption by the timer is conducted when the internal timer runs out. This operation is shown in FIG. 2b. If the internal timer runs out while in the waiting condition of CPU 13, it then goes back to the main routine through step 31 because a timer register TMR is zero and flag register TSF is zero (steps 7 and 8).

Referring to FIG. 3, when the power is turned on, the CPU 33 of the controller 30 initializes its internal memories (step 42). Then CPU 33 waits for a closing of send/receive switch 38 or the audio receive line 17R is in use (43-53-55-59-43). This is the waiting condition of CPU 33. The operations of CPU 13 and 33 will be explained referring to FIGS. 2a, 2b and 3.

(1) Sending a Facsimile Signal:

When the operator sets the original papers on the printer/scanner 50 and presses the send/receive switch 38, the original paper sensor 52 detects the original paper and the send/receive switch is kept closed while it is pressed. In step 45, CPU 13 outputs a line request signal to NCU 10 through the steps 43 and 44. Then CPU 13 goes to step 10 and then to step 17 to set 2 in a flag register TSF. In step 18, CPU 13 sends out off-hook signals to the communication line through transmitter 1. CPU 13 also turns on the relays 14 and 15 in step 19 and waits for a line signal from CPU 33 in step 20. The relays 14 and 15 switches the communication line from the handset to the facsimile 60. CPU 33 executes the send subroutine 46 which will be explained later with the reference to FIGS. 4a –4c. When the transmission is over, CPU 33 sends the end signal to the communication line in step 48 and releases a line signal to NCU 10 in step 52. In accordance with releasing of the line signal, CPU 13 stops supplying a power to relays 14 and 15 in step 21. In step 22 CPU 13 sends output off-hook signals to the communication line in step 22, then goes back to a waiting condition.

(2) Automatic Reception:

When the auto/manual switch 40 is pushed to set the auto mode and a ring comes in to the transceiver CPU 13 output a signal PCS=1 to the communication controller 30 in step 11. If the operator does not pick up the handset then CPU 13 goes to steps 11-6-7-8-9-10-4-11. CPU 33 responds to the signal PCS=1 from CPU 13 then outputs a line request signal in step 49 through steps 53 and 54. In accordance with the line request signal, CPU 13 sets 2 into the flag register TSF in step 17 and sends off-hook signal to the line through the transceiver 1 in step 18. In step 19, CPU 13 turns on the relays 14 and 15 then CPU 13 waits for the line signal to be released by CPU 33 in step 20. By these steps, the relays 14 and 15 change the communication line from handset to the facsimile 11 and 12. CPU 33 executes the receive subroutine 50 which will be explained later with reference to FIGS. 4a to 4c. When the communication is over, CPU 33 releases the line request signal to CPU 13 in step 52 then goes back to the waiting condition. CPU 13 corresponds to a release of the line signal in step 20 then stops supplying the power to the relays 14 and 15 in step 21. CPU 13 also sends on-hook signal to the communication line in step 22 and goes back to a waiting condition.

(3) Manual Reception:

When the out auto/manual switch is opened to set a manual reception and a ring comes in to the transmitter 1, CPU 13 outputs a signal PCS=1 to CPU 33 in step 11. In response to this CPU 33 goes to steps 53-54-55-59-43-53. When the operator hangs up the handset 2, a ring signal goes off and a busy signal comes on. CPU 13 checks flag register TSF in step 12 and clears the timer register TMR in step 13. CPU 13 sets 1 into the flag register TSF in step 14 and turns on the relay 16 in step 15. CPU 33 waits for a line request signal while CPU 33 goes to steps 10-4-5-6-12-16-10. By turning on the relay 16, the audio signal line 17R is connected to the communication controller 30. CPU 33 goes to steps 43-53-55-56-59-43. When the send/receiver switch 38 is closed, CPU 33 sends a line request signal to CPU 13 in step 49. Then the reception is executed in step 50.

(4) Automatic Reception if the handset 2 is picked up while ringing:

CPU 13 responds to a ring and sends a signal PCS=1 to CPU 33 through step 4. When the operator does not pick up the handset 2 CPU 13 goes to steps 4-116-7-8-9-10-4. When the operator picks up the handset 2, CPU 13 sends a signal PCS=0 and goes to steps 4-5-6-7-8-9-10-4. When the operator picks up the handset 2, a ring signal goes off and a busy signal comes on. CPU 13 checks flag register TSF in step 12 and clears the timer register TMR in step 13. CPU 13 sets I into the flag register TSF and supplies power to the relay 16 and waits for a line request signal from CPU 13. While CPU 13 is waiting, CPU 13 goes to steps 10-4-5-6-12-16-10.

By supplying the power to the relay 16, the audio signal line 17 R is connected to the communication controller 30. That means the line is busy. CPU 13 goes to steps 43-53-55-56-59-43, because the relay 16 is turned on. When the operator pushes the send/receive switch 38, CPU 33 sends the line request signal to CPU 13 in step 49. In step 50, a reception is conducted. In this process, the operator picks up the handset 2 and CPU 33 has to exchange a protocol with the sender. If the protocol does not exchange with the sender, CPU 13 releases a line request signal and cuts off the power to the relays 14 and 15 in step 21. CPU 13 checks whether the line is busy or not and if it is busy CPU 13 goes to steps 4-5-6-12-13-14-15-10-4. When the handset 2 is released, CPU 13 goes back to the waiting condition. Thus, when the auto-mode is set, and the operator picks up the handset 2 to answer a ring, the facsimile recognizes whether the sender is a facsimile or a plain telephone call automatically. If the facsimile recognizes that the sender is not a facsimile, the line is connected back to the handset 2.

(5) Manual reception and the signal changes from a plain telephone call to a facsimile: When a ring comes in to the transceiver 1, CPU 13 sends a signal PCS=1 to CPU 33 in step 11. CPU 33 goes to steps 53-54-55-59-43-53 in response to the signal. When the operator picks up the handset 2, the line becomes busy and CPU 13 checks flag register TSF. CPU 13 clears the timer register TMR in step 13 and sets 1 into the flag register TSF. CPU 13 supplies the power to the relay 16 and waits for a line request signal from CPU 33. While CPU 13 is waiting, CPU 13 goes through steps 10-4-5-6-12-16-10-4. By supplying the power to the relay 16, the audio signal line 17 R is connected to the communication controller 30. This means the line is busy. CPU 33 goes through steps 43-53-54-55-56-59-43 because the relay 16 is turned on. If the signal is a facsimile, the signal CNG comes to the audio signal line 17 R and goes to the communication controller 30 through the amplifier AMP 11. CPU 33 detects this signal is step 56 and increments 1 of the CNG register in step 57. CPU 33 then checks whether the register FCN is greater than 2 in step 58. If the number is less than 2, CPU 33 goes through steps 43-53-55-56-57. In step 57, CPU 33 increments 1 of the register FCN and checks whether the register FCN is greater than 2 in step 58. If CPU 33 does not detect CNG, CPU 33 clears the register FCN in step 59. In this process, if CPU 33 detects CNG twice, CPU 33 executes a reception in step 50. CPU 13 executes steps 10–20. Therefore, if the sender sends a facsimile signal CNG, the receiver executes a reception automatically. In this embodiment, CPU 33 checks CNG twice so that a facsimile would not respond to line noise.

If a ring comes in and the handset is picked up, CPU 13 clears the timer register TMR in step 13. CPU 13 sets 1 into the flag register TSF in step 14, supplies the power to the relay 16 in step 15 and enables the communication controller 30 to detect a facsimile signal CNG. If the sender is a plain telephone call, CPU 13 goes to steps 6–15. CPU 13 goes to the timer interruption (TMI: FIG. 2b) and the flag register TSF is set as 1, so CPU 13 increments 1 of the timer register TMR in step 33. CPU 13 checks whether the timer register TMR is a set time Tm in step 34. If not, CPU 13 goes back to the main routine. If yes, CPU 13 sets 2 into the flag register TSF.

If the signal is not a facsimile, CPU 33 does not send a line request signal so that CPU 13 does not go to step 17. CPU 13 goes back to step 4 from step 10. When the flag register TSF shows 2, CPU 13 checks the flag register TSF in step 16. CPU 13 stops supplying power to the relay 16 in step 9. After these steps, CPU 13 goes through steps 10-4-5-6-12-16-9-10-4 until the handset 2 is released. When the handset 2 is released CPU 13 goes back to the waiting condition (6-7-8-9-10-4-6).

If a facsimile signal CNG is not detected within a certain period of time Tm, even if the relay 16 is turned on after a ring, the controller 30 does not recognize a facsimile machine CNG so the facsimile signal is not received. In this embodiment, a time Tm is set at 30 seconds. When the operator picks up the handset, the sender waits for a facsimile signal for 35 seconds. This gives the receiver 30 seconds to detect a signal CNG from the sender. If time runs over Tm, the manual reception is executed by pressing send/receive switch 38.

In accordance with the above-mentioned facsimile, the facsimile signal realizes when the sender is sending a facsimile signal, even if the receiver releases the handset before the facsimile signal has been received.

Referring to FIGS. 4a through 4c, sending subroutine 46 and receiving subroutine 50 of CPU 33 will be explained. In these figures, the left hand side of the flow charts show the sending operation of CPU 33 and the right hand side of the flow chart show the receiving operation of CPU 33.

Referring to FIG. 4a, when sender's CPU 33 goes to step 46, CPU 33 dials the receivers telephone number, in step S1 and CPU 33 waits for the answer tone (receivers digital identification signal: DIS) from the receiver. When CPU 33 receives the DIS signal, CPU 13 sends an off-hook signal in step 18. CPU 33 puts a "break mode signal" into DIS and sends this DIS back (R2a, R2b). When CPU 33 receives the DIS in step S2, CPU 33 checks whether the DIS includes a break mode signal in step S3a. If yes, CPU 33 sets a "break mode sending" by itself and puts a break mode sending signal into DCS (digital operation) in step S3b. If none, CPU 33 sets a "normal mode sending" signal into DCS in step S3d. CPU 33 sends back the DCS signal and its own identification number SXX (its own telephone number) in step S3e.

In reception, when receiver's CPU 33 receives DCS signal in step R3, CPU 33 checks whether the DCS signal includes a break mode signal in step R4a. If yes, CPU 33 memorizes the received identification number SXX in step R4b and sets a "break mode reception" by itself in step R4c. If the DCS signal indicates a normal mode sending CPU 33 sets a normal mode sending by itself in step R4d. Next a training is conducted between the sender's CPU 33 and the receiver's CPU 33 in steps S4 and R4e. When the training is over, both CPU 33 initialize the registers of frame numbers as zero in step S5 and R5.

These are pre-processed before an actual transmission of the image signal is made. The senders CPU 33 starts reading an original paper, when CPU 33 reads one frame (256 byte) of image signal (compressed coded signal), CPU 33 stores it into the first area of the buffer memory (block memory). While CPU sends out the image signal from the first area of the buffer memory, CPU 33 stores the next image signal into the second area of the buffer memory. While CPU sends out the image signal from the second area of the buffer memory, CPU 33 stores the next image signal into the third area of the buffer memory and so on in step S6b. When CPU 33 processes one step of the memory, CPU 33 increments 1 of the frame number register and checks the condition of the communication line in step S7a. If the communication line is off the CPU 33 goes to the operation which is shown in FIG. 4c. The transceiver 1 watches the level of reception of radio waves and sends a level signal to CPU 13. CPU 13 sends a signal which indicates whether the communication line is on when the level signal is greater than a threshold. CPU 13 sends a signal which indicates whether the communication line is off when the level signal is less than the threshold. In accordance with these signals, CPU 33 judges the condition of the communication line.

If the line is on, CPU 33 sends PPS (a signal indicates the end of sending of one block signal, the end of the paper and a signal which shows how many more pages will follow) in step S7b–S7d. Even CPU 33 does not finish sending one block but if it is the end of the page, the PPS indicates the end of the page in step S7b–S7c–S7e. CPU 33 waits for a signal from the receiver.

The receivers CPU 33 checks errors when CPU 33 is receiving the first frame image signal. If not, CPU 33 stores the first frame image signal into the first area of the block memory in step R6c. When CPU 33 is receiving the second frame image signal, CPU 33 checks errors and stores it into the second area of the block memory. CPU 33 increments 1 of the frame number register when CPU 33 has received one frame image signal. If CPU 33 detects errors CPU 33 stores its frame number into the memory in step R6d and CPU 33 does not store its frame image signal into the block memory.

The receivers CPU 33 checks the communication line when CPU 33 has received one frame image signal in step R7a. If the communication is off, CPU 33 goes to the operation which is shown in FIG. 4c. If the communication is on, CPU checks the PPS signal in step R7b. CPU 33 executes the above-mentioned process until PPS is detected. When PPS is detected, in step R7b, CPU 33 checks whether there is an error in the received frame image signal in step R8a. If an error is detected, CPU 33 sends a signal which indicates that the error has occurred and also sends a frame number to the sender in step R8c. If no error has occurred, CPU sends a signal which indicates that no error was made to the sender in step R8b. If PPS does not indicate the end of the page, CPU 33 transfers the data from the block memory to the output memory in order to print out in step R6b. CPU 33 transfers the data to print while CPU 33 is receiving the next image signal in step R6. If PPS indicates the end of the page, CPU 33 sends a signal to change the paper in the printer. If PPS indicates the end of the transmission and CPU 33 sends no error signal in step R8b, CPU 33 sends a signal which indicates the end of the transmission to the printer in steps R9a and R9b, then CPU 33 goes back to step 52 in FIG. 3.

The receivers CPU 33 receives the answer to PPS in step S8a, S8b and checks whether PPS indicates an error in step S9a, S9m. If PPS indicates no error and the end of the transmission in step S9m and S9n, CPU 33 goes back to step 48 in FIG. 3. When PPS does not indicate the end of the page or the end of the transmission, CPU 33 goes through steps S9a, S9j and S9k. CPU goes to step S6. When PPS indicates the end of the transmission, CPU 33 goes to step 48 in FIG. 3. If PPS indicates that an error was made, the receivers CPU 33 checks whether the number of transmission is greater than 4 in step S9b. If not, CPU 33 again sends the image frame signal which was indicated by the error signal and increments 1 of the number of the sending number N in step S9g, S9h. When CPU 33 sends out all the error frame image signals again, CPU 33 sends PPS signal in step S7d. The receiving CPU 33 checks the image signal again and if no error was made, CPU 33 stores the image signal into the correspondence frame of the block memory. All the image signal has been received, CPU 33 sends back PPS signal in step R8a, R8b. If error has occurred again, CPU 33 sends out the error signal again in step R8c. Thus, the sender's CPU 33 tries to send the image which was in the error signal which was requested by the receiver's CPU 33 four times. If error still exists after four tries, the sender's CPU 33 goes to step S9b and S9c and checks the fallback. In this embodiment, the facsimile device is provided with two baud rates which are 4,800 bps and 2,400 bps. If the current baud rate is set at 4,800 bps in step S9c, the facsimile device can go down to rate 2,400 bps. So CPU 33 judges that the fallback will be available. If the current baud rate is set at 2,400 bps, CPU 33 checks whether CPU 33 has already decided the communication baud rate to be at 2,400 bps in the beginning of the communication (this means, CPU 33 decided that 4,800 bps was not available) or checks whether CPU 33 has gone through step S9b (this means, CPU 33 already went down its communication rate into 2,400 bps). If yes, CPU 33 judges that the fallback will not be available. When CPU 33 judges the fallback will be available, the sender's CPU 33 sends CTC signal to set the baud rate down to 2,400 bps in step S9d. The receiver's CPU 33 responds to CTC signal and sends back CTR signal to set the same mode in step S9c. The sender's CPU 33 clears the number of the sending number N in step S9f, increments 1 of the number of the sending number and sends the frame which is in error again in step S9g, S9h and sends PPS signal in step S7d. If CPU 33 judges that the fallback will not be available. CPU 33 sends EOR signal (the end of retrying transmission) in step S9i and finishes sending the image signal which is in error in steps S9j, S9k. The receivers CPU 33 receives CTC signal, CPU 33 checks whether the fallback (2,400 bps) will be available in step R9e. If yes, CPU 33 sends CTR signal in step R9f and receives the image signal which was in error in step R6. If not, CPU 33 prints out that block of signal and stops communication in step R9g. When the receivers CPU 33 receives EOR signal, CPU 33 goes to step R6. Therefore, if an error is made in a transmission of 1 block (256 frame) image signal, CPU 33 tries to send that signal up to 8 times (4 time at 4,800 bps, 4 times at 2,400 bps). If an error still exists, CPU 33 stops sending that signal and goes to next step.

Referring to FIG. 4c, the operation of CPU 33 will be explained when the communication is interrupted. The senders CPU 33 detects the interruption of the communication line in step S7a, CPU 33 starts the timer Tp1 in step S10, checks whether CPU 33 is storing an image signal into the block memory in step S11a. If CPU 33 is not storing, CPU 33 starts storing an image signal into block memory in step S11. When the image signal indicates the end of the page, CPU 33 stops storing and waits for a ring in step S11c. In the meantime, CPU 33 checks whether the timer Tp1 runs out in step S11d. If it does, CPU 33 stops sending in step 46. When the receiver CPU 33 detects an interruption of the communication line in step R7a, CPU 33 starts the timer Tp1 in step R10. CPU 33 stores the error frame number in step R11a. CPU 33 waits for whether the communication is on in step R11c or the timer Tp1 runs out in step R11b. When the communication line is on, CPU 33 calls the sender in step R11d in the period of Tp2 in step R12a–R12f. When the senders CPU 13 receives the call from the receivers CPU 33, CPU 13 sends back the signal to the senders CPU 33 in step S11e. CPU 33 starts the timer Tp3 in step S12a and waits for a call in step S12b and S12c. The senders CPU 33 receives a ring, CPU 33 sends back its own telephone number in step R12g and starts timer Tp4 in step R12h. When the senders CPU 33 receives the telephone number, CPU 33 checks whether that telephone number is the same as the previous number in step S12d. If it is the same, CPU 33 sends a "resend signal" in step S12f and clears the number of the resend signal N in step S13 and waits for a further response in step S8a. If the timer Tp3 runs out and CPU 33 does not receive any telephone number or if it is not the same, CPU 33 prepares for a new reception in step R2a. When the receivers CPU 33 receives the resend signal, CPU 33 sets and sends data which includes the error signal in steps R13a, R13c and R8c. After that process, CPU 33 operates the same as if resending the error signal. If the receivers CPU 33 does not receive a resending signal even CPU 33 sends out its own telephone number, CPU 33 ends receiving in step 50 when the timer Tp4 runs out.

While the invention has been particularly shown and described with reference to preferred embodiments thereof, it will be understood by those in the art that the foregoing and other changes in form and details may be made therein without departing from the spirit and scope of the invention.

What is claimed is:

1. A mobile facsimile machine for communicating with a sender, comprising:

sending means for sending image signals through a transmitter;

receiving means for receiving image signals through a receiver;

detecting means for detecting whether a communication error exists during reception;

first memory means for memorizing an identification of the sender when receiving said signals;

second memory means for memorizing a position of image signals if said detection means detects that the communication error exists during reception, calling means operable for calling said sender by using said memorized identification and sending said memorized position of said image signals to said sender via said sending means, said sending means also operable for sending information to the sender identifying the mobile facsimile machine, said sender operable for sending a re-send signal to said receiving means in response to receiving the information identifying the mobile facsimile machine from said sending means, said calling means calling said sender and sending said memorized position of said image signals to said sender if said receiving means receives the re-send signal from said sender.

2. The mobile facsimile machine as defined in claim 1, wherein said sending means sends the re-send signal to said receiving means through a wireless communication path.

3. The mobile facsimile machine as defined in claim 2, further comprising means for detecting whether said receiving means receives the re-send signal.

4. The mobile facsimile machine as defined in claim 1, further comprising a telephone headset, and means for detecting a facsimile signal even if said headset is released prior to said receiving means receiving the facsimile signal.

5. The mobile facsimile machine as defined in claim 1, wherein the information identifying the mobile facsimile machine is the phone number of the mobile facsimile machine.

* * * * *